(12) United States Patent
Brevick et al.

(10) Patent No.: US 10,830,349 B2
(45) Date of Patent: Nov. 10, 2020

(54) VARIABLE PITCH STATOR STRUCTURE WITH ALL BLADES FREE TO ROTATE AND TORQUE CONVERTER WITH VARIABLE PITCH STATOR

(71) Applicant: Ford Global Technologies, LLC, Dearborn, MI (US)

(72) Inventors: John Edward Brevick, Livonia, MI (US); Keith A. Devereaux, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 16/106,896

(22) Filed: Aug. 21, 2018

(65) Prior Publication Data

US 2020/0063863 A1 Feb. 27, 2020

(51) Int. Cl.
| | |
|---|---|
| *F16H 61/56* | (2006.01) |
| *F16H 41/26* | (2006.01) |
| *F16H 45/02* | (2006.01) |
| *F16H 41/28* | (2006.01) |
| *F04D 13/02* | (2006.01) |

(52) U.S. Cl.
CPC ........... *F16H 61/56* (2013.01); *F04D 13/022* (2013.01); *F16H 41/26* (2013.01); *F16H 41/28* (2013.01); *F16H 45/02* (2013.01); *F16H 2041/285* (2013.01)

(58) Field of Classification Search
CPC ........ F04D 13/022; F16H 41/26; F16H 41/28; F16H 45/02; F16H 61/59; F16H 2041/285; F16D 33/04; F16D 33/20
See application file for complete search history.

(56) References Cited

U.S. PATENT DOCUMENTS

| | | | |
|---|---|---|---|
| 3,046,745 A | 7/1962 | Price, Jr. et al. | |
| 3,354,643 A * | 11/1967 | Paredes | F16H 61/56 60/354 |
| 4,377,068 A | 3/1983 | Braatz | |
| 4,848,084 A | 7/1989 | Wirtz | |
| 5,307,629 A | 5/1994 | By et al. | |
| 7,341,430 B2 | 3/2008 | Sano et al. | |
| 7,850,420 B2 * | 12/2010 | Brees | F04D 29/542 415/146 |
| 9,689,492 B2 * | 6/2017 | LaVoie | F16H 61/56 |
| 9,784,353 B2 | 10/2017 | Frait et al. | |
| 10,274,081 B2 * | 4/2019 | Depraete | F16H 61/56 |
| 10,571,004 B2 * | 2/2020 | Derhammer | F16H 41/26 |
| 2004/0062650 A1 | 4/2004 | Makim et al. | |

(Continued)

FOREIGN PATENT DOCUMENTS

| | | |
|---|---|---|
| CN | 201539359 | 8/2010 |
| FR | 2445915 | 8/1980 |
| GB | 1542552 | 3/1979 |

(Continued)

*Primary Examiner* — Brian P Wolcott (74) *Attorney, Agent, or Firm* — Burris Law, PLLC (57) ABSTRACT

A torque converter stator includes a hub, an outer ring, a plurality of blades, and a plurality of spokes. The hub is disposed about an axis. The blades are disposed radially between the outer ring and the hub. All of the blades are pivotable relative to the hub and outer ring. The spokes are spaced apart from the blades and fixed to the hub and the outer ring to support the outer ring relative to the hub.

20 Claims, 10 Drawing Sheets

(56) References Cited

U.S. PATENT DOCUMENTS

2007/0220874 A1* 9/2007 Hemphill ................ F16H 41/24
60/341

FOREIGN PATENT DOCUMENTS

| JP | 2006038043 | 2/2006 |
| JP | 2013155032 | 8/2013 |
| JP | 2016211594 | 12/2016 |

* cited by examiner

VARIABLE PITCH STATOR STRUCTURE WITH ALL BLADES FREE TO ROTATE AND TORQUE CONVERTER WITH VARIABLE PITCH STATOR

FIELD

The present disclosure relates to a variable pitch stator structure with all blades free to rotate and a torque converter with a variable pitch stator.

BACKGROUND

The statements in this section merely provide background information related to the present disclosure and may not constitute prior art.

Automatic transmission vehicles typically include a torque converter between the engine and the transmission. Typical torque converters include a pump, a turbine, and a stator, in which the stator blades are positioned at a fixed pitch within the torque converter. The pitch of the stator blades is usually chosen optimize performance, e.g., fuel economy, power, noise, vibration, and harshness (NVH) across the full range of operating speeds. This optimization across the entire range typically results in lower than optimal performance for any specific speed.

Attempts at producing variable pitch stators were made in the past, but these attempts typically required each blade to be handled and assembled one at a time. A typical stator can include around twenty to thirty stator blades. The labor intensive processes needed to produce those variable pitch torque converters made those early variable pitch stators cost prohibitive to use in large production quantities and could also result in greater scrap rates due to more opportunities for assembly error.

These and other limitations of traditional torque converter stators are addressed by the present disclosure.

SUMMARY

In one form, a torque converter stator includes a hub, an outer ring, a plurality of blades, and a plurality of spokes. The hub is disposed about an axis. The blades are disposed radially between the outer ring and the hub. All of the blades are pivotable relative to the hub and outer ring. The spokes are spaced apart from the blades and fixed to the hub and the outer ring to support the outer ring relative to the hub.

According to a further form, the torque converter stator has a different number of spokes than blades.

In yet another form, the torque converter stator further includes a plurality of pivot members, a plurality of actuation members, and an actuator. Each pivot member extends from a first side of a corresponding one of the blades. Each actuation member extends from a second side of a corresponding one of the blades. The second side is opposite the first side. The pivot members and actuation members support the blades for rotation relative to the hub and outer ring. The actuator is coupled to the actuation members and configured to move the actuation members to pivot the blades.

In still another variation, the spokes are thinner than pivot members and the spokes are thinner than the actuation members.

According to a further form, the first side is radially outward of the second side.

In yet another form, the actuator is disposed within the hub.

In still another form, the torque converter stator further includes a one-way clutch disposed within the hub.

According to a further form, the outer ring includes a first housing ring and a second housing ring. The first and second housing rings having opposing surfaces that cooperate to form radially extending outer pivot grooves. Each of the pivot members being rotatably received in a corresponding one of the outer pivot grooves.

In yet another variation, the hub includes a housing body and a housing cover. The housing body and housing cover having opposing surfaces that cooperate to form radially extending inner pivot grooves. Each of the actuator members being rotatably received in a corresponding one of the inner pivot grooves.

In still another form, the spokes include a first set of spokes that extend from the housing body to the first housing ring, and a second set of spokes that extend from the housing cap to the second housing ring.

According to a further form, the actuator includes an annular piston slidably disposed within a cylinder defined by the hub.

In yet another form, the actuator includes a spring configured to bias the piston in one axial direction.

In still another variation, each of the actuator members form a crank coupled to the piston.

In yet another variation, each pivot member is unitarily formed with a corresponding one of the actuator members to define a shaft that extends through the corresponding blade.

According to a further form, each pivot member is unitarily formed with a corresponding one of the actuator members and the corresponding blade.

According to a further variation, the spokes extend at an angle from the hub to the outer ring.

In another form, a torque converter stator includes a first body, a second body, a first ring, a second ring, a plurality of blades, and a plurality of spokes. the first and second bodies are coupled together to form a hub. The first and second rings are coupled together to form an outer ring. The blades are disposed radially between the hub and the outer ring. All of the blades are pivotable relative to the hub and the outer ring. Each spoke has a first end fixed to the hub and a second end fixed to the outer ring.

According to a further form, the plurality of spokes includes a first set of the spokes and a second set of the spokes. The first ends of the first set of spokes are fixedly attached to the first body. The second ends of the first set of spokes are fixedly attached to the first ring. The first ends of the second set of spokes are fixedly attached to the second body. The second ends of the second set of spokes are fixedly attached to the second ring.

In yet another form, the torque converter stator further includes an actuator disposed within the hub and coupled to the blades. The actuator is configured to rotate the blades relative to the hub and outer ring.

In still another variation, the actuator includes a piston and a plurality of crank members. The piston is slidably disposed within the hub. Each crank member has a first end non-rotatably coupled to a corresponding one of the blades and a second end rotatably coupled to the piston. The crank members are configured to rotate the blade when the piston moves axially relative to the hub.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
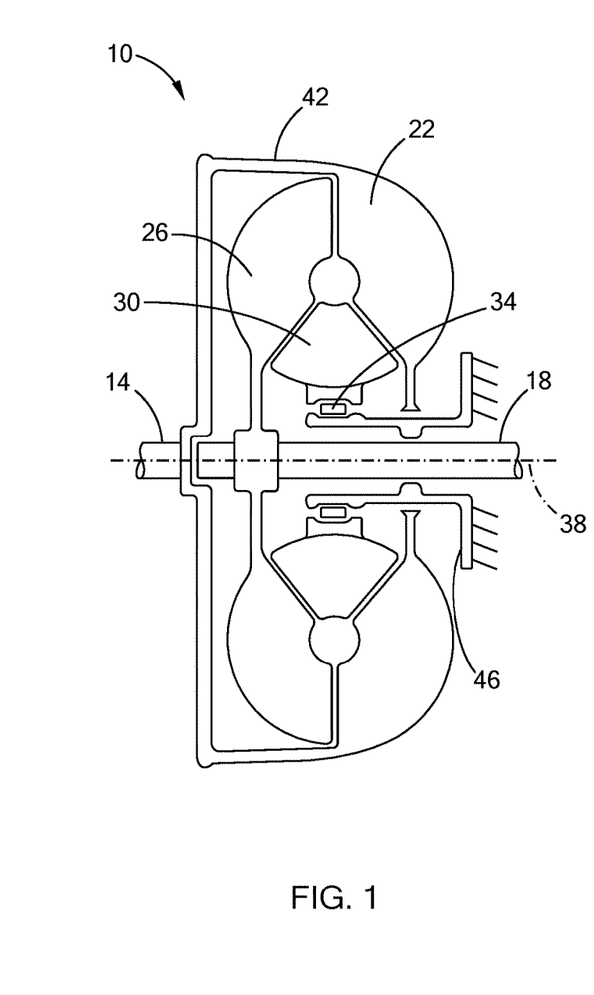
FIG. 1 is a schematic sectional view of a torque converter in accordance with the teachings of the present disclosure.

With reference to FIG. 1, an example of a torque converter 10 constructed in accordance with the teachings of the present disclosure is schematically illustrated. The torque converter 10 includes an input member 14, an output member 18, a pump 22, a turbine 26, and a stator 30. In the example provided, the torque converter 10 also includes a one-way clutch 34, also known as an overrunning clutch. The torque converter is generally disposed about a central axis 38.

The input member 14 is supported for rotation about the axis 38 and is configured to receive input torque from a prime mover (not shown; e.g., an electric motor, or an internal combustion engine). For example, the input member 14 can be drivingly coupled to an internal combustion engine (not shown) by a flywheel (not shown). The output member 18 is supported for rotation about the axis 38 and is configured to output torque to a set of drive wheels (not shown). For example, the output member 18 can be drivingly coupled to the drive wheels (not shown) by a transmission (not shown). The input member 14 and the output member 18 are generally supported for rotation about the axis 38 relative to each other. The pump 22, the turbine 26, and the stator 30 are generally disposed about the axis 38 and configured to cooperate to transmit torque from the input member 14 to the output member 18 and can act to multiply the input torque so that increased torque is output by the output member 18. While described with reference to providing power to drive wheels of a vehicle, the torque converter 10 can be used in other torque transmitting applications besides vehicles.

In the example provided, the input member 14 includes a main housing 42. The pump 22 can be constructed in a conventional manner for a torque converter pump, but generally, the pump 22 includes a plurality of pump or impeller blades (not shown) that are spaced apart circumferentially about the axis 38 and are coupled to the main housing 42 for common rotation about the axis 38. The turbine 26 can be constructed in a conventional manner for a torque converter turbine, but generally, the turbine 26 includes a plurality of turbine blades (not shown) that are disposed within the main housing 42. The turbine blades (not shown) are spaced apart circumferentially about the axis 38 and are coupled to the output member 18 for common rotation about the axis 38.

The stator 30 is described in greater detail below, but is generally configured to direct flow of transmission oil from the turbine 26 to the pump 22. The stator 30 is generally coupled to a rotationally stationary part 46 that does not rotate about the axis 38 (e.g., a transmission case of the transmission). In the example provided, the one-way clutch 34 is disposed between the stator 30 and the rotationally stationary part 46 and configured to permit the stator 30 to rotate relative to the stationary part 46 in one rotational direction about the axis 38, but not in the opposite rotational direction.

Figure 2:
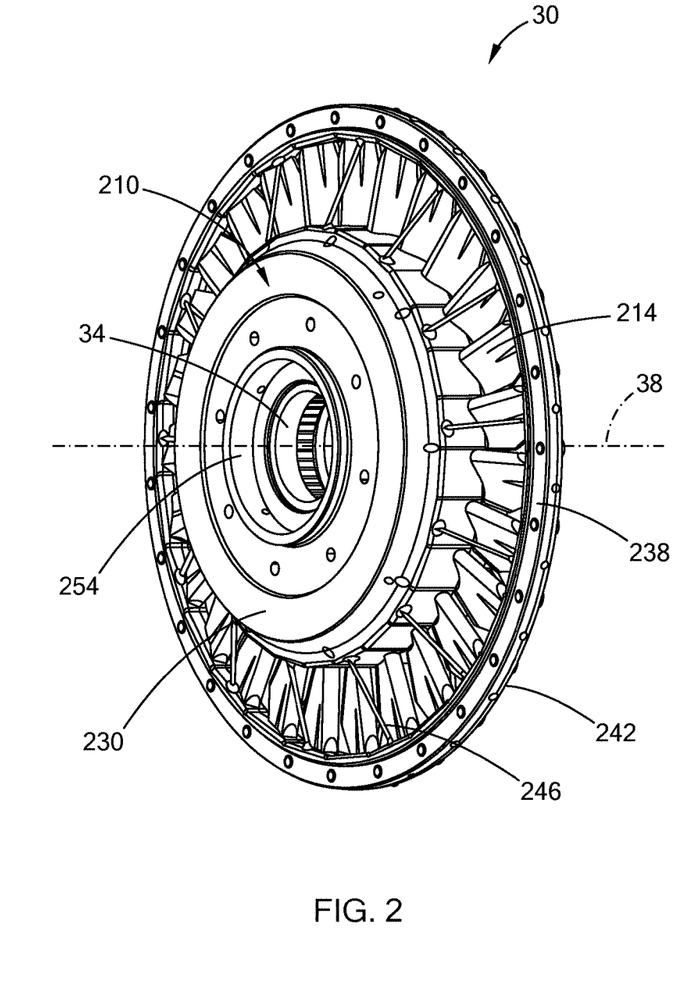
FIG. 2 is a perspective view of a stator of the torque converter of FIG. 1.
Figure 3:
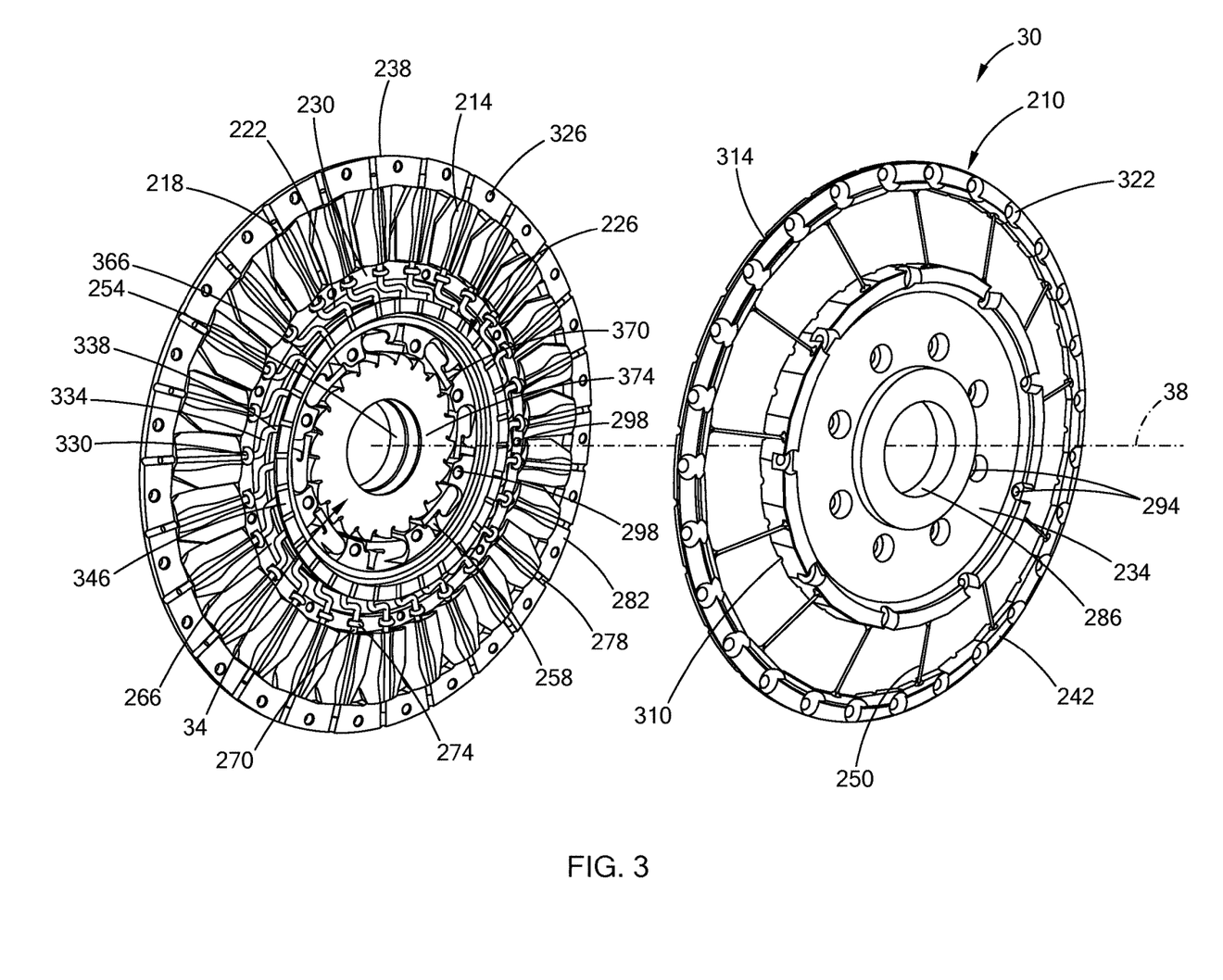
FIG. 3 is a partially exploded perspective view of the stator of FIG. 2.
Figure 4:
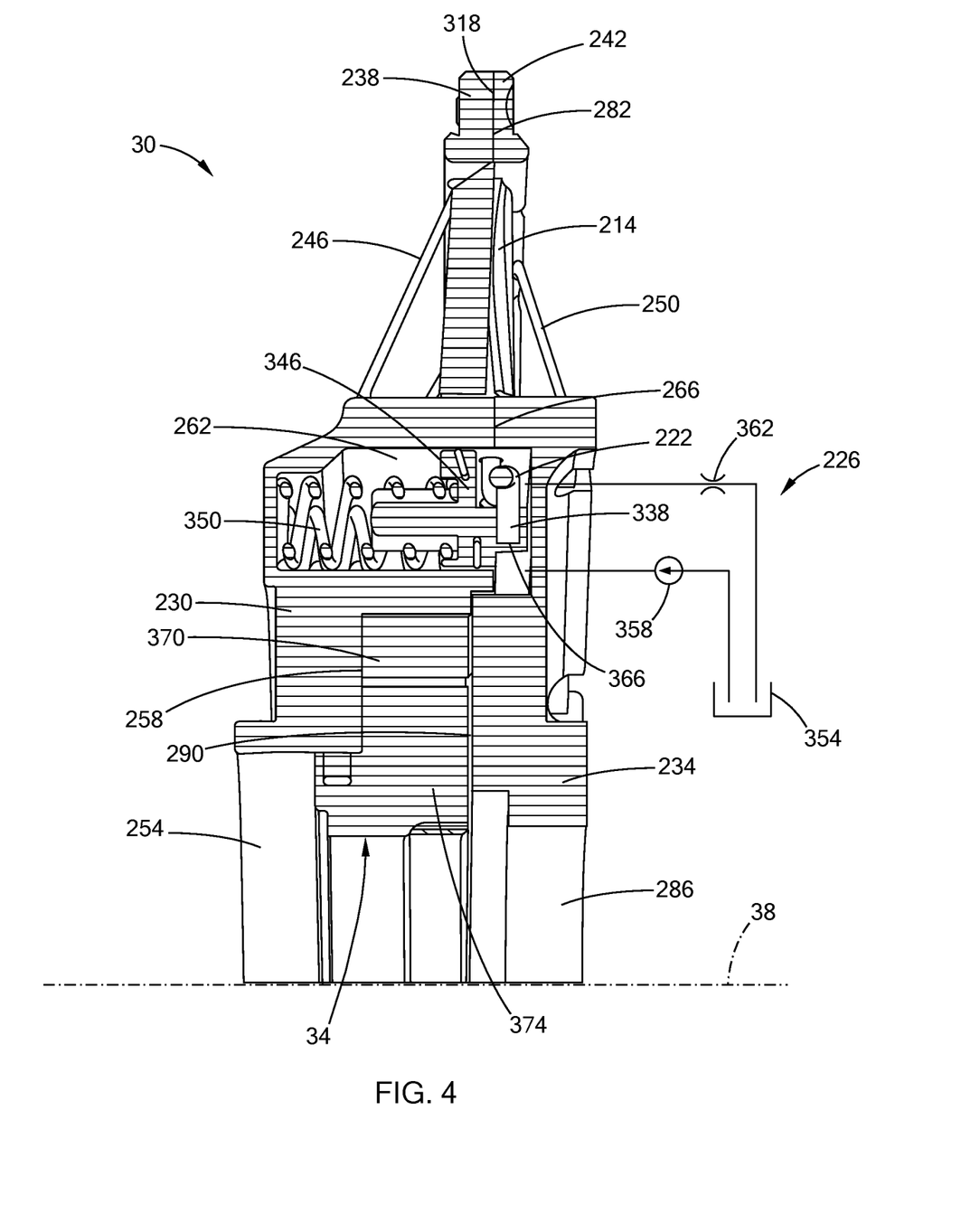
FIG. 4 is a cross-sectional view of a portion of the stator of FIG. 2.

With additional reference to FIGS. 2-4 the stator 30 is shown in greater detail. The stator 30 includes a stator housing 210, a plurality of stator blades 214, a plurality of pivot members 218, a plurality of actuation members 222, and an actuator 226.

The stator housing 210 includes a housing body 230, a housing cover 234, a first housing ring 238, a second housing ring 242, a plurality of first supports 246, and a plurality of second supports 250. The housing body 230 is a generally annular shaped body that has a central bore 254 coaxial with the axis 38. In the example provided, the housing body 230 defines a clutch recess 258 and an annular recess that defines a portion of an annular actuator chamber 262. The clutch recess 258 is disposed radially inward of the actuator chamber 262 and is open through a first side 266 of the housing body 230 and open through the housing body 230 in the radially inward direction toward the axis 38. The portion of the actuator chamber 262 defined by the housing body 230 is open through the first side 266 of the housing body 230.

In the example provided, the first side 266 of the housing body 230 also includes a plurality of inner pivot grooves 270 that are disposed radially outward of the actuator chamber 262 and are equally spaced apart in the circumferential direction about the housing body 230. The inner pivot grooves 270 are open through a radially outward surface of the housing body 230 and extend longitudinally along axes that intersect at the axis 38. The number of inner pivot grooves 270 corresponds to the number of stator blades 214 and pivot members 218. Each inner pivot groove 270 is a semi-cylindrical shaped groove configured to cradle a portion of one of the pivot members 218 as discussed below. In the example provided, the housing body 230 may optionally define seal grooves that intersect each inner pivot groove 270 perpendicularly and permit a seal (e.g., o-rings 274) to form a seal between the pivot members 218 and the stator housing 210, while still permitting rotation of the pivot members 218 relative to the stator housing 210.

The first housing ring 238 is an annular shaped body coaxial with the axis 38 and disposed radially outward of the housing body 230. The first housing ring 238 defines a plurality of outer pivot grooves 278, the number of which corresponds to the number of inner pivot grooves 270 of the housing body 230. The outer pivot grooves 278 are open through a first side 282 of the first housing ring 238 and are open through a radially inward surface of the first housing ring 238. The outer pivot grooves 278 are aligned with the inner pivot grooves 270 so that they extend longitudinally along the same axes as the inner pivot grooves 270. Each outer pivot groove 278 is a semi-cylindrical shaped groove configured to cradle a portion of one of the pivot members 218 as discussed below. In the example provided, the outer pivot grooves 278 extend radially outward to also be open through a radially outward surface of the first housing ring 238.

The first supports 246 are thin, but rigid spokes that extend in the radial direction between the first housing ring 238 and the housing body 230 to support the first housing ring 238 coaxially relative to the housing body 230. In the example provided, there are fewer first supports 246 than stator blades 214 and the first supports 246 are thinner than the pivot members 218, though other configurations can be used. The first supports 246 can be equally spaced apart in the circumferential direction about the axis 38. An inward end of each first support 246 is rigidly coupled (e.g., welded) to the housing body 230 and an outward end of each first support 246 is rigidly coupled (e.g., welded) to the first housing ring 238. In the example provided, the inward ends of the first supports 246 are at a location that is axially offset from the first housing ring 238 so that the first supports 246 extend at an angle from the housing body 230 to the first housing ring 238.

The housing cover 234 is a generally annular shaped body that has a central bore 286 coaxial with the axis 38. The housing cover 234 has a first side 290 that faces toward and can abut the first side 266 of the housing body 230. The housing cover 234 is configured to be fixedly (i.e., rigidly or non-movably) coupled to the housing body 230 to cover the first side 266 of the housing body 230. While not specifically shown, additional seals can be used to form a seal between the first side 266 of the housing body 230 and the first side 290 of the housing cover 234. In the example provided, the housing cover 234 is fixedly coupled to the housing body 230 by a plurality of bolts (not specifically shown) received through bores 294 in the housing cover 234 and threadably engaged with threaded bores 298 in the housing body 230, though other configurations can be used (e.g., rivets, or welding). In the example provided, the housing cover 234 has an annular recess that is open through the first side 290 of the housing cover 234 to define the rest of the actuator chamber 262.

In the example provided, the housing cover 234 includes a plurality of inner pivot grooves 310 that correspond to and oppose the inner pivot grooves 270 of the housing body 230. The inner pivot grooves 310 are disposed equally spaced apart in the circumferential direction about the housing cover 234. The inner pivot grooves 310 are open through a radially outward surface of the housing cover 234 and extend longitudinally along axes that intersect at the axis 38 (e.g., the same axes as the inner pivot grooves 270). The number of inner pivot grooves 310 corresponds to the number of stator blades 214 and pivot members 218. Each inner pivot groove 310 is a semi-cylindrical shaped groove configured to cradle a portion of one of the pivot members 218 as discussed below. In the example provided, the housing cover 234 may optionally define seal grooves that intersect each inner pivot groove 310 perpendicularly and permit the seal (e.g., the o-rings 274) to form a seal between the pivot members 218 and the stator housing 210, while still permitting rotation of the pivot members 218 relative to the stator housing 210.

The second housing ring 242 corresponds to the first housing ring 238 and is an annular shaped body coaxial with the axis 38 and disposed radially outward of the housing cover 234. The second housing ring 242 defines a plurality of outer pivot grooves 314 that correspond to and oppose the outer pivot grooves 278 of the first housing ring 238. The outer pivot grooves 314 correspond to the inner pivot grooves 310 of the housing cover 234. The outer pivot grooves 314 are open through a first side 318 of the second housing ring 242 that opposes the first side 282 of the first housing ring 238 and the outer pivot grooves 314 are open through a radially inward surface of the second housing ring 242. The outer pivot grooves 314 are aligned with the inner pivot grooves 310 so that they extend longitudinally along the same axes as the inner pivot grooves 310. Each outer pivot groove 314 is a semi-cylindrical shaped groove configured to cradle a portion of one of the pivot members 218 as discussed below. In the example provided, the outer pivot grooves 314 extend radially outward to also be open through a radially outward surface of the second housing ring 242.

The first side 318 of the second housing ring 242 faces toward and can abut the first side 282 of the first housing ring 238. The second housing ring 242 is configured to be fixedly coupled to the first housing ring 238 to cover the first side 282 of the first housing ring 238. In the example provided, the second housing ring 242 is fixedly coupled to the first housing ring 238 by a plurality of bolts (not specifically shown) received through bores 322 in the second housing ring 242 and threadably engaged with threaded bores 326 in the first housing ring 238, though other configurations can be used (e.g., rivets, or welding).

The second supports 250 are thin, but rigid spokes that extend in the radial direction between the second housing ring 242 and the housing cover 234 to support the second housing ring 242 coaxially relative to the housing cover 234. In the example provided, there are fewer second supports 250 than stator blades 214, there are the same number of second supports 250 as first supports 246, and the first and second supports are not directly aligned with each other in the circumferential direction, though other configurations can be used. In the example provided, the second supports 250 are thinner than the pivot members 218 and can be generally the same thickness as the first supports 246, though other configurations can be used. The second supports 250 can be equally spaced apart in the circumferential direction about the axis 38. An inward end of each second support 250 is rigidly coupled (e.g., welded) to the housing cover 234 and an outward end of each second support 250 is rigidly coupled (e.g., welded) to the second housing ring 242. In the example provided, the inward ends of the second supports 250 are at a location that is axially offset from the second housing ring 242 so that the second supports 250 extend at an angle from the housing cover 234 to the second housing ring 242. In the example provided, the inward ends of the first and second supports 246, 250 are further apart in the axial direction than their corresponding outward ends.

Each stator blade 214 has a shape generally configured to direct fluid flow within the torque converter 10. Each stator blade 214 is disposed in the space radially between the housing body 230 and the first housing ring 238, which is also radially between the housing cover 234 and the second housing ring 242. In the example provided, the pivot members 218 are generally thin cylindrical, but rigid straight wires. In the example provided, the pivot members 218 have a cross-sectional thickness (e.g., diameter) that is less than or equal to the thickness of the stator blade 214. In the example provided, the diameter of the pivot members 218 is approximately 2 millimeters, though other configurations can be used. Each pivot member 218 is fixedly coupled to a corresponding one of the stator blades 214 and extends radially outward from a radially outward side of the corresponding stator blade 214. Each pivot member 218 is received in the corresponding outer pivot grooves 278, 314 so that the pivot member 218 can rotate about its axis relative to the housing rings 238, 242.

In the example provided, the actuation members 222 are generally thin cylindrical, but rigid wires that have a double bend to form a first leg 330, a second leg 334, and a third leg 338. In the example provided the actuation members 222 have a cross-sectional thickness (e.g., diameter) that is less than or equal to the thickness of the stator blade 214. In the example provided, the diameter of the actuation members 222 is approximately 2 millimeters, though other configurations can be used. In the example provided, the first leg 330 is fixedly coupled to the corresponding one of the stator blades 214 and extends radially inward from a radially inward side of the stator blade 214. The first leg 330 is coaxial with the corresponding pivot member 218. Each first leg 330 is received in the corresponding inner pivot grooves 270, 310 so that the first leg 330 can rotate about its axis relative to the housing body 230 and housing cover 234. In the example provided, the first leg 330 extends radially inward into the actuator chamber 262. In the example provided, the second leg 334 extends generally perpendicularly from the radially inward end of the first leg 330 in the actuator chamber 262 between the housing body 230 and the housing cover 234. In the example provided, the third leg 338 extends generally perpendicularly from the second leg 334 in the direction radially inward toward the axis 38, while remaining within the actuator chamber 262.

In the example provided, each pivot member 218 and its corresponding actuation member 222 is a unitarily formed wire that includes a middle portion 342 (shown in FIGS. 11 and 12) that connects the pivot member 218 to the first leg 330 by extending longitudinally through a bore in the corresponding stator blade 214. In the example provided, the middle portion 342 (shown in FIGS. 11 and 12) of the unitarily formed wire has a predetermined shape, such as splines (shown in FIGS. 11 and 12), a flat, or other appropriate shape, and the bore of the stator blade 214 has a mating predetermined shape so that the stator blade 214 cannot rotate relative to the middle portion 342 of the wire. In an alternative configuration, not specifically shown, the pivot member 218 and actuation member 222 can be separate parts fixedly attached to the stator blade 214. In another alternative configuration, not specifically shown, the pivot member 218, the stator blade 214 and the actuation member 222 can be a single integrally formed part.

Returning to the example provided, the actuator 226 is generally configured to displace the third leg 338 of the actuation members 222 to rotate the stator blades 214 relative to the stator housing 210. In the example provided, the actuator 226 is a hydraulically operated piston-cylinder type linear actuator, though other types of linear actuators can be used (e.g., solenoid actuator). In the example provided, the actuator 226 includes the actuator chamber 262, a piston 346, a plurality of return springs 350, a fluid reservoir 354, and a pump 358. In the example provided, the actuator 226 can also include a bleed valve 362.

The piston 346 is a generally annular shaped body axially slidable within the actuator chamber 262. In the example provided, the piston 346 includes a piston head and a plurality of spring seats. the piston head is an annular body coaxial with the axis 38. In the example provided, a seal ring can form a seal between the outer cylindrical surface of the piston head and the housing body 230 and another seal ring can form a seal between the inner cylindrical surface of the piston head and the housing body 230. The piston head also defines a circumferential groove 366 that extends circumferentially about the piston head and is open through a radially outer surface of the piston head. The distal ends of the third legs 338 of the actuation members 222 are disposed within the circumferential groove 366. Thus, when the piston 346 moves axially in the actuator chamber 262, the third legs 338 move axially with the piston 346, causing the stator blades 214 to rotate relative to the stator housing 210.

The spring seats are spaced in the circumferential direction about the axis 38 and extend in the direction axially away from the housing cover 234. In the example provided, the return springs 350 are coil springs spaced in the circumferential direction about the axis 38 within the portion of the actuator chamber 262 defined by the housing body 230. Each return spring 350 can be disposed about a corresponding one of the spring seats to retain its spacing. The return springs 350 can bias the piston 346 in the direction axially toward the housing cover 234. While individually spaced apart coil springs are illustrated, other types of springs can be used. For example, in one alternative configuration not shown, an annular wave spring can be coaxial with the axis instead of the plurality of return springs 350 and spring seats.

The reservoir 354 is configured to hold a volume of hydraulic fluid or oil. The pump 358 is configured to draw fluid from the reservoir 354 and pump the fluid to the actuator chamber 262. In the example provided, the reservoir 354 and pump 358 are remote from the torque converter 10 and are coupled to the stator 30 by a conduit. In the example provided, the pump 358 is coupled for fluid communication to the side of the actuator chamber 262 that is defined by the annular recess in the housing cover 234. In the example provided, the pump 358 is a one-way pump and the bleed valve 362 is in fluid communication with the reservoir 354 and the actuator chamber 262 on the same side of the piston 346 as the pump 358. Thus, when the pump 358 is deactivated, the return springs 350 can move the piston 346 to cause the fluid to return to the reservoir 354 via the bleed valve 362. In an alternative configuration, not specifically shown, the pump 358 can be a two-way pump to return the fluid to the reservoir 354.

In the example provided, the one-way clutch 34 includes a plurality of clutch members 370 and a clutch wheel 374 disposed within the clutch recess 258. The clutch members 370 can be biased radially inward by springs (not shown).

The clutch wheel 374 includes a plurality of ramps disposed about its outer circumference that are configured to lockingly engage the clutch members 370 in a manner that prevents the clutch wheel 374 from rotating in one rotational direction relative to the housing body 230, while slidingly engaging the ramps to permit the clutch wheel 374 to rotate in the opposite rotational direction relative to the housing body 230. In the example provided, the clutch wheel 374 is non-rotatably coupled to the stationary part 46 (FIG. 1; e.g., the transmission case).

In operation, the torque converter 10 can operate as a typical torque converter, except that when different torque multiplication amounts are needed, the actuator 226 can be activated to move the piston 346 and rotate the stator blades 214 to a different pitch relative to the stator housing 210.

Figure 5:
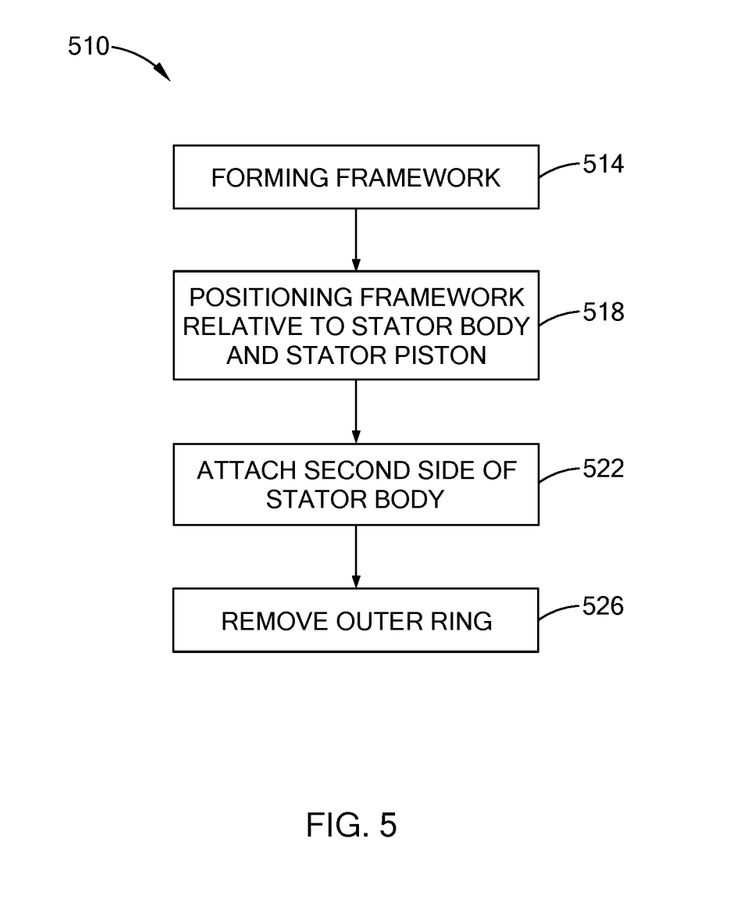
FIG. 5 is a flow chart of a method of manufacturing the stator of FIG. 2 in accordance with the teachings of the present disclosure.
Figure 6:
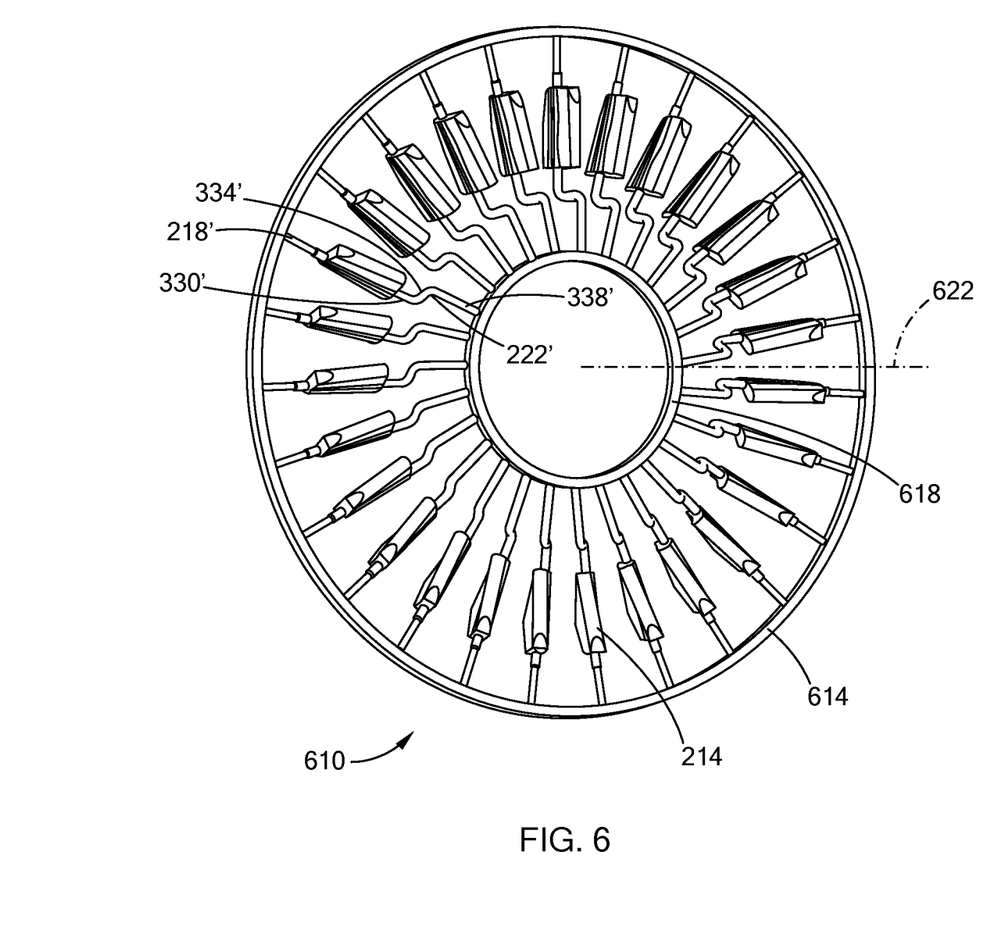
FIG. 6 is a perspective view of a framework in accordance with the teachings of the present disclosure for use in the method of FIG. 5.

With additional reference to FIGS. 5-9, a method 510 of manufacturing the stator 30 is provided and is illustrated with the steps generally shown in flow chart form in FIG. 5. At step 514, a framework 610 (FIGS. 6 and 7) is formed. With specific reference to FIGS. 6 and 7, the framework 610 includes an outer ring 614, pivot members 218', actuation members 222', and the stator blades 214. In the example provided, the framework 610 (FIGS. 6 and 7) also includes an inner ring 618. The pivot members 218' are similar to the pivot members 218 (FIG. 3), except that the pivot members 218' are in a pre-finished form in which the pivot members 218' extend further radially outward from the stator blades 214 than the finished pivot members 218 (FIG. 3). The actuation members 222' are similar to the actuation members 222 (FIG. 3), except that the actuation members 222' are in a pre-finished form in which the third legs 338' of the actuation members 222' extend further radially inward from the stator blades 214 than the finished actuation members 222 (FIG. 3). Accordingly, elements denoted by primed reference numerals are similar to the elements denoted with non-primed reference numerals described above, except as otherwise shown or described herein.

Figure 7:
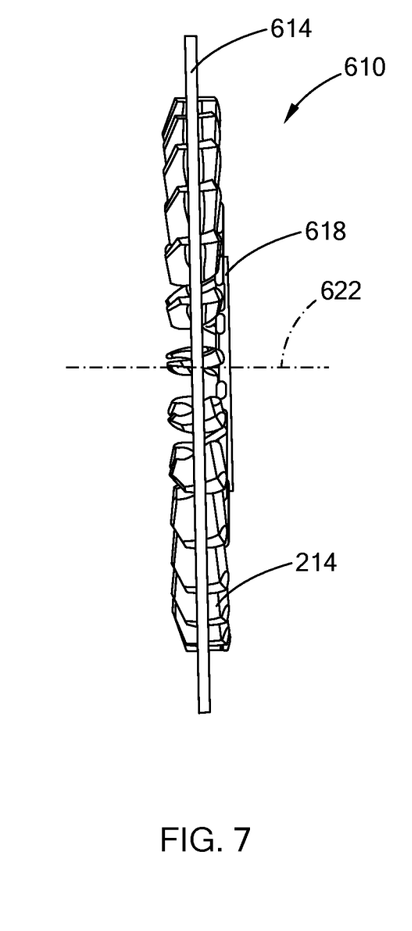
FIG. 7 is a side view of the framework of FIG. 6.

The outer ring 614 has an inner diameter that is greater than the outermost diameter of the first and second housing rings 238, 242 (FIGS. 2-4). The outer ring 614 is a relatively thin, but rigid annular body disposed about an axis 622. In the example provided, the outer ring 614 has a thickness in the axial direction that is approximately equal to the diameter of the pivot members 218', though other configurations can be used. In the example provided, the outer ring 614 is formed from a round wire having a diameter of approximately 2 millimeters, though other configurations can be used. The radially outermost end of each pivot member 218' is fixedly coupled to the inner diameter of the outer ring 614. The pivot members 218' are spaced circumferentially about the axis 622 to correspond to the spacing of the outer pivot grooves 278, 314 (FIG. 3) and the first legs 330' of the actuation members 222' are positioned to correspond to the spacing of the inner pivot grooves 270, 310 (FIG. 3). As best shown in FIG. 7, the inner ring 618 is coaxial with the outer ring 614, but is offset from the outer ring 614 in the axial direction. The radially inward most ends of the third legs 338' of the actuation members 222' are fixedly coupled to the outer diameter of the inner ring 618. The inner ring 618 is a relatively thin, but rigid annular body disposed about the axis 622. In the example provided, the inner ring 618 has a thickness in the axial direction that is approximately equal to the diameter of the actuation members 222', though other configurations can be used. In the example provided, the inner ring 618 is formed from a round wire having a diameter of approximately 2 millimeters, though other configurations can be used. The steps in the formation of the framework 610 are described in greater detail below.

Once the framework 610 is formed, the framework 610 can be easily transported, packaged, or handled without disrupting positioning of the stator blades 214. When the rest of the stator 30 is ready to be assembled, the inner ring 618 can be cut off from the actuation members 222' and can be cut so that the actuation members 222' are their finished lengths. Accordingly, the actuation members at this stage in the method are now referred to with reference numeral 222. In an alternative configuration, not specifically shown, the inner ring 618 can be omitted and not attached to the actuation members 222 and the actuation members 222 can already be their finished lengths.

Figure 8:
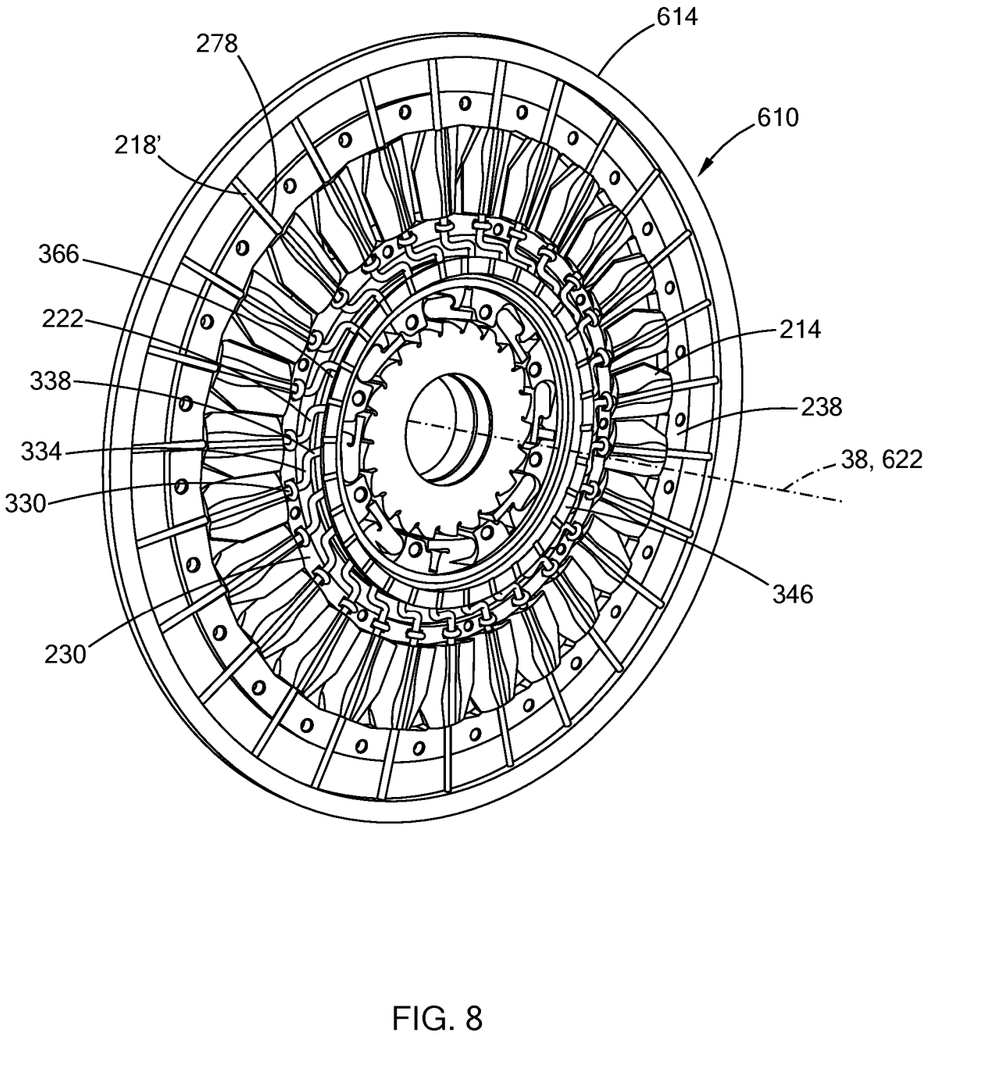
FIG. 8 is a perspective view of a portion of the stator of FIG. 2, illustrated at a one step in the method of FIG. 5.

The method 510 then proceeds to step 518. As shown in FIG. 8, at step 518, the framework 610 without the inner ring 618 is positioned relative to the housing body 230, the first housing ring 238, and the piston 346 so that the axes 38, 622 are coaxial. In the example provided, the housing body 230 is already coupled to the first housing ring 238 by the first supports 246 (shown in FIG. 2). The radially inward ends of the third legs 338 of the actuation members 222 are positioned into the circumferential groove 366 of the piston 346. The piston 346 is positioned within the annular recess of the housing body 230 that defines the portion of the actuator chamber 262 shown in FIG. 4). The first legs 330 are positioned in the inner pivot grooves 270 and the pivot members 218' are positioned in the outer pivot grooves 278. At this stage, the outer ring 614 is still attached to the pivot members 218' and the method can proceed to step 522.

Figure 9:
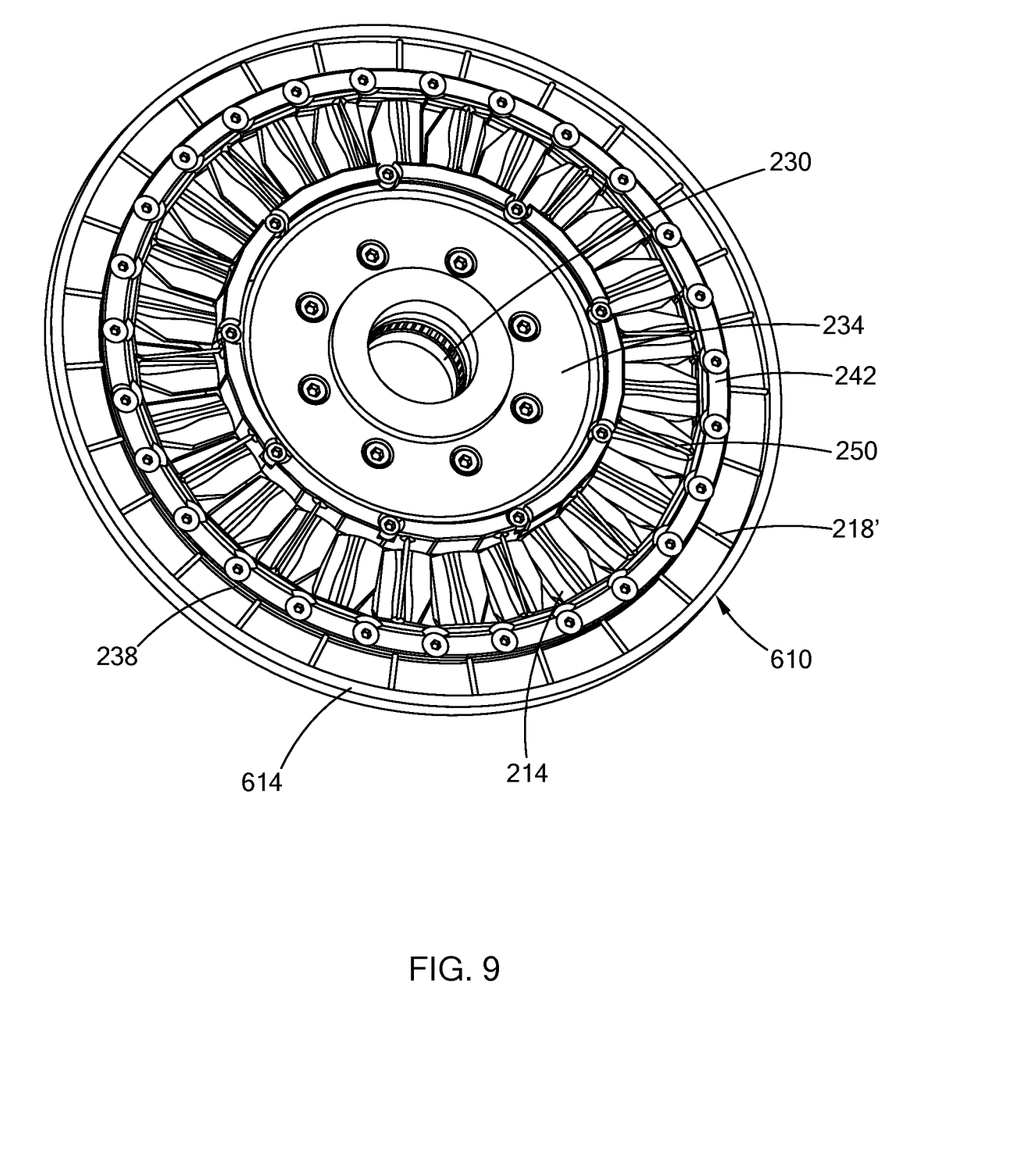
FIG. 9 is a perspective view of the stator of FIG. 2, illustrated at another step of the method of FIG. 5.

With specific reference to FIG. 9, At step 522, the housing cover 234 and second housing ring 242 can be aligned coaxially with the housing body 230 and the first housing ring 238. In the example provided, the housing cover 234 is already coupled to the second housing ring 242 by the second supports 250. The housing cover 234 can be attached to the housing body 230 and the second housing ring 242 can be attached to the first housing ring 238. The method can proceed to step 526.

At step 526, the pivot members 218' can be cut to remove the outer ring 614. The pivot members 218' can be cut to their finished lengths, or can be cut and then machined to their finished lengths. Accordingly, the pivot members are referred to with reference numeral 218 at this stage. In the example provided, the radially outward ends of the pivot members 218 are flush with the radially outward surface of the first and second housing rings 238, 242, though other configurations can be used. In an alternative configuration, not specifically shown, the pivot members 218' can be cut to remove the outer ring 614 while the pivot members 218' and actuation members 222 rest in the outer pivot grooves 278 and inner pivot grooves 270, but before the housing cover 234 and second housing ring 242 are attached to the housing body 230 and first housing ring 238.

Figure 10:
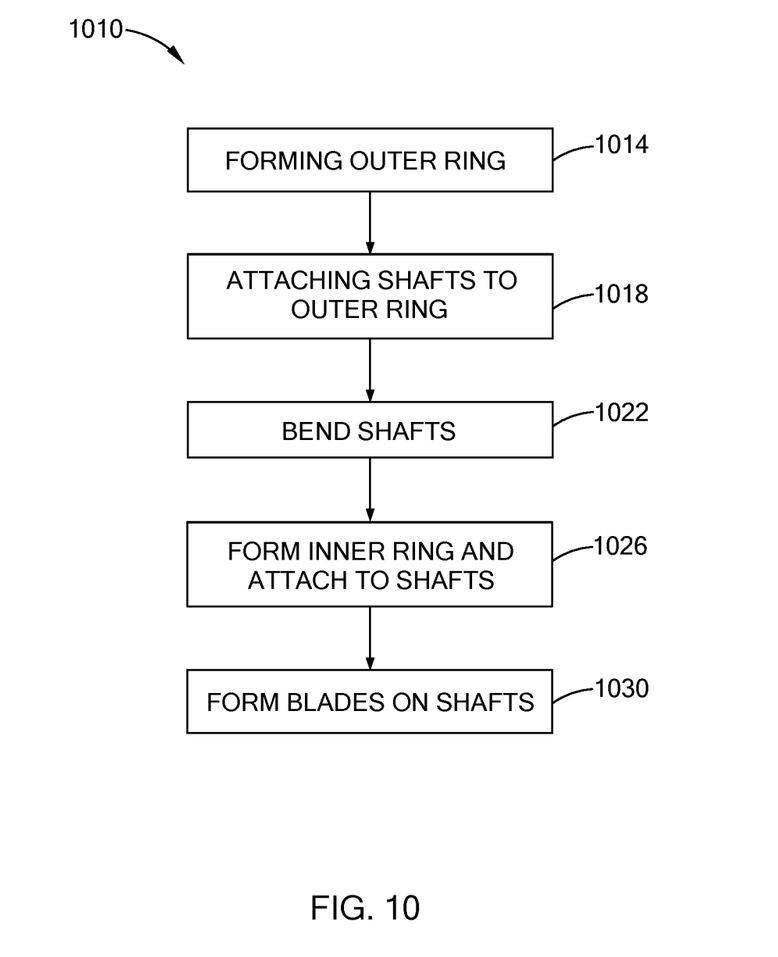
FIG. 10 is a flow chart of a method of manufacturing the framework of FIG. 6 in accordance with the teachings of the present disclosure.

With additional reference to FIGS. 10-13, a method 1010 of forming the framework 610 is provided and is illustrated with the steps generally shown in flow chart form in FIG. 10. At step 1014, the outer ring 614 is formed. In the example provided, the outer ring 614 is formed from a straight metal wire that is bent into a circular shape and the opposite ends are welded together to form the complete annular outer ring 614. In the example provided, the outer ring 614 is a steel material (e.g., mild steel), though other materials can be used. The outer ring 614 can alternatively be formed in other manners, such as stamped from a single piece of material or cast for example. In the example provided, the method 1010 then proceeds to step 1018.

Figure 11:
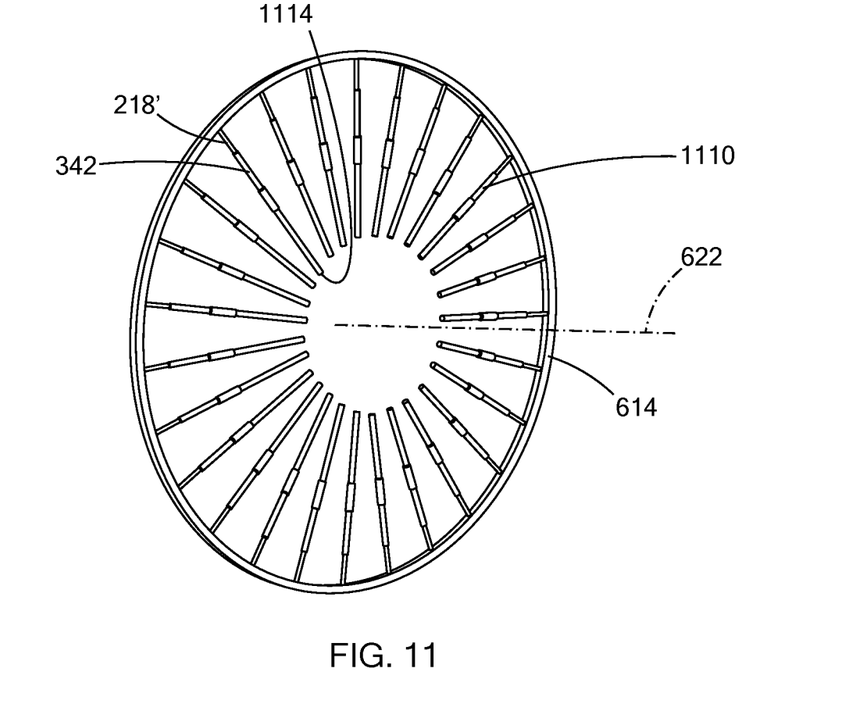
FIG. 11 is a perspective view of a portion of the framework of FIG. 6, illustrated at one step of the method of FIG. 10.

With specific reference to FIG. 11 and at step 1018, a plurality of linear, or straight shafts 1110 are fixedly attached (e.g., welded) to the outer ring 614. In the example provided, the shafts 1110 are a steel material (e.g., mild steel), similar to the outer ring 614, though other materials can be used. The shafts 1110 are attached to the outer ring 614 so that the shafts 1110 are equally spaced apart in the circumferential direction about the axis 622. The radially outward ends of the shafts 1110 are the pivot members 218'. The middle regions of the shafts 1110 are the middle portions 342 and extend colinearly to and radially inward from the pivot members 218'. The radially inward ends 1114 of the shafts 1110 extend colinearly to and radially inward from the middle portions 342 and correspond to the actuation members 222' (FIGS. 6 and 7), except that the inward ends 1114 are straight.

In the example provided, the predetermined shape (e.g., splines, flat, or other non-concentric shape) are formed (e.g., pressed or stamped) in the middle portions 342 before the shafts 1110 are attached to the outer ring 614. In an alternative configuration, the predetermined shape can be formed into the shafts 1110 after the shafts 1110 are attached to the outer ring 614, but before step 1022. In the example provided, the method 1010 then proceeds to step 1022.

Figure 12:
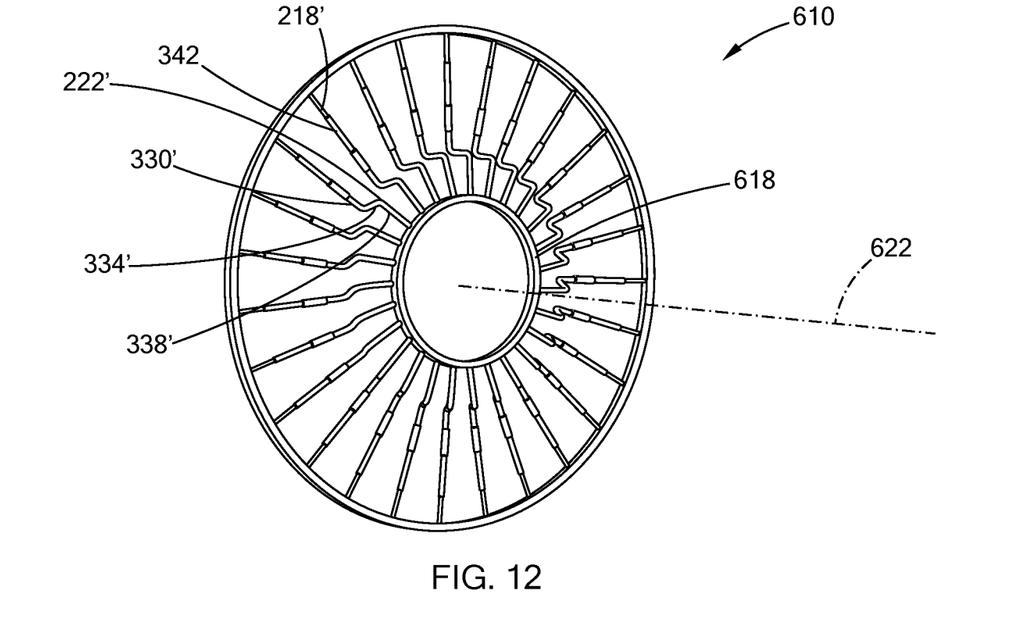
FIG. 12 is a perspective view of a portion of the framework of FIG. 6, illustrated at another step of the method of FIG. 10.

With specific reference to FIG. 12 and at step 1022, the inward ends 1114 can be bent to form the first legs 330', second legs 334', and third legs 338' of the actuation members 222'. In the example provided, both bends of the actuation members 222' are formed with a single stamping process. In the example provided, the outer ring 614 with the straight shafts 1110 is placed on a first stamping die (not shown) and a second stamping die (not shown) presses the inward ends 1114 into the double bend shapes to form the first legs 330', the second legs 334', and the third legs 338'.

In an alternative configuration, not specifically shown, the first and second dies can also form the predetermined shape on the middle portions 342 with the same stamping process as the bends. In another alternative configuration, not shown, a separate process can form the predetermined shape on the middle portions 342 after the double bends are formed.

Returning to the example provided, the method 1010 can proceed to step 1026, where the inner ring 618 can be formed. In the example provided, the inner ring 618 is formed from a straight metal wire that is bent into a circular shape and the opposite ends are welded together to form the complete annular inner ring 618. In the example provided, the inner ring 618 is a steel material (e.g., mild steel), similar to the outer ring 614, though other materials can be used. The inner ring 618 can alternatively be formed in other manners, such as stamped from a single piece of material or cast for example. At step 1026, the inner ring 618 is then positioned coaxial with the outer ring 614, but axially offset (as best seen in FIG. 7) and the inner ring 618 is attached (e.g., welded) to the third legs 338' of the actuation members 222'. In an alternative configuration, not shown, the inner ring 618 can be formed and attached to the inward ends 1114 (FIG. 11), then the bends can be made followed by the outer ring 614 being attached to the pivot members 218'.

Figure 13:
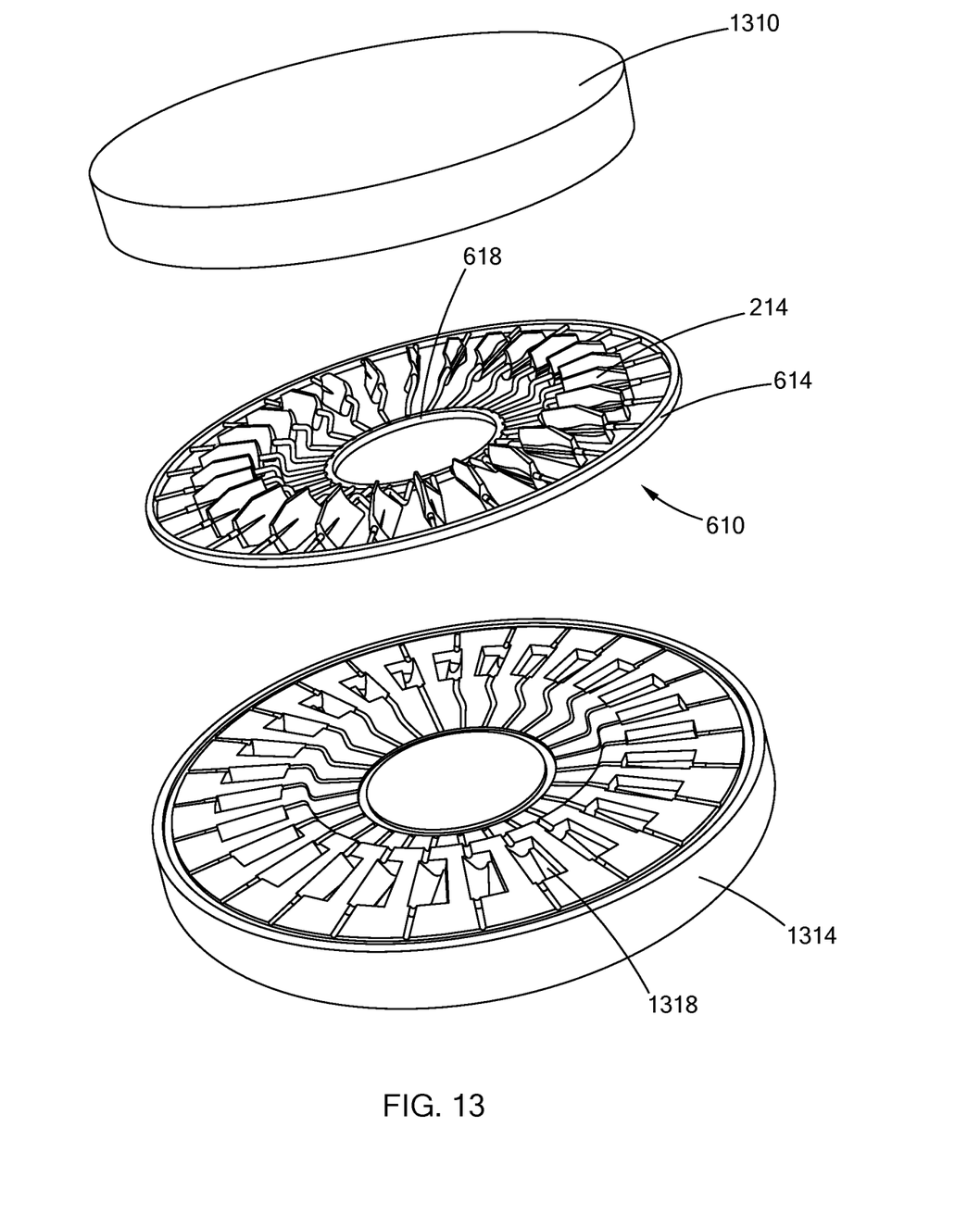
FIG. 13 is a perspective view of the framework of FIG. 6 at another step of the method of FIG. 10, illustrated with a plurality of dies in accordance with the teachings of the present disclosure.

With specific reference to FIG. 13, and at step 1030, the stator blades 214 can be formed on the middle portions 342 (shown in FIGS. 11 and 12) to complete the formation of the framework 610. In the example provided, the incomplete framework shown in FIG. 12 (i.e., without the stator blades 214) is placed between two dies 1310, 1314 that cooperate to form chambers 1318 that have shapes corresponding to the shapes of the stator blades 214. While not specifically shown, the dies 1310, 1314 can have a series of gates and risers. In the example provided, the stator blades 214 are aluminum, though other materials can be used. In the example provided, the dies 1310, 1314 are closed around the incomplete framework and molten aluminum is poured or allowed to flow into the gates (not shown) until it fill the chambers 1318. The molten aluminum is allowed to cool and then the dies are separated and the framework 610 is removed. Finishing work (e.g., shearing, grinding, or machining) may need to be done on the framework 610 to remove any material left from the gates and risers (not shown).

In an alternative configuration, the incomplete framework as shown in FIG. 12 is metal, while the dies 1310, 1314 are injection molding dies. In this configuration, a liquid polymer or composite material can be injected into the dies 1310, 1314 and allowed to cure to form the stator blades 214. In another alternative configuration, the incomplete framework as shown in FIG. 12 is one type of polymer or composite material that is injection molded between dies similar to the dies 1310, 1314, except without the chambers 1318 for the stator blades 214; then the incomplete framework is inserted between dies similar to the dies 1310, 1314 and a different polymer or composite material is injected into the dies to over-mold the stator blades 214 onto the rest of the framework 610.

In another alternative configuration, the entire framework 610 is a polymer or composite material and the method 1010 is replaced by a single step of injection molding the entire framework 610 (i.e., including the outer ring 614, the inner ring 618, the pivot members 218', and the actuation members 222') between two dies similar to the dies 1310, 1314. In another alternative configuration, the entire framework 610 is a single type of metal material and the method 1010 is replaced by a single step of casting the entire framework 610 (i.e., including the outer ring 614, the inner ring 618, the pivot members 218', and the actuation members 222') between two dies similar to the dies 1310, 1314.

In another alternative configuration, the straight shafts 1110 (FIG. 11) can already have their predetermined shaped middle portion 342 and the stator blades 214 can be separately formed to have their mating predetermined shaped bore. The stator blades 214 can then be slid onto the straight shafts 1110 (FIG. 11) before the shafts 1110 are attached to the outer ring 614.

While the steps of the methods 510 and 1010 are shown and described with reference to particular example orders of the steps, these example orders are not intended to be understood as the only possible orders of the steps.

Accordingly, the teachings of the present disclosure provide for a variable pitch torque converter stator and a method that allows for manufacturing the variable pitch stator in a robust, cost effective, and time-efficient manner. The stator and method of the present disclosure provides a robust and low-cost torque converter in which the stator blade pitch can be varied to optimize performance at particular speeds. In addition to optimizing power, fuel efficiency, and NVH, the stator of the present disclosure can also reduce the effects of turbo-lag in turbocharged vehicles.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A torque converter stator comprising:
   a hub disposed about an axis;
   an outer ring;
   a plurality of blades disposed radially between the outer ring and the hub, all blades of the plurality of blades being pivotable relative to the hub and outer ring, wherein the plurality of blades includes all blades of the torque converter stator that are disposed radially between the outer ring and the hub, wherein each blade of the plurality of blades is immediately adjacent to a corresponding pair of blades of the plurality of blades; and
   a plurality of spokes spaced apart from the plurality of blades and fixed to the hub and the outer ring to support the outer ring relative to the hub.

2. The torque converter stator of claim 1, wherein the torque converter stator has a different number of spokes than blades.

3. The torque converter stator of claim 1, further comprising:
   a plurality of pivot members, each pivot member extending from a first side of a corresponding one of the plurality of blades;
   a plurality of actuation members, each actuation member extending from a second side of a corresponding one of the plurality of blades, the second side being opposite the first side, the plurality of pivot members and the plurality of actuation members supporting the blades for rotation relative to the hub and the outer ring;
   an actuator coupled to the plurality of actuation members and configured to move the plurality of actuation members to pivot the plurality of blades.

4. The torque converter stator of claim 3, wherein each spoke of the plurality of spokes is thinner than each pivot member of the plurality of pivot members and each spoke of the plurality of spokes is thinner than each actuation member of the plurality of actuation members.

5. The torque converter stator of claim 3, wherein the first side is radially outward of the second side.

6. The torque converter stator of claim 5, wherein the actuator is disposed within the hub.

7. The torque converter stator of claim 6, further comprising a one-way clutch disposed within the hub.

8. The torque converter stator of claim 6, wherein the outer ring includes a first housing ring and a second housing ring, the first and second housing rings having opposing surfaces that cooperate to form radially extending outer pivot grooves, each of the plurality of pivot members being rotatably received in a corresponding one of the outer pivot grooves.

9. The torque converter stator of claim 8, wherein the hub includes a housing body and a housing cover, the housing body and housing cover having opposing surfaces that cooperate to form radially extending inner pivot grooves, each of the plurality of actuator members being rotatably received in a corresponding one of the inner pivot grooves.

10. The torque converter stator of claim 9, wherein the plurality of spokes include a first set of spokes that extend from the housing body to the first housing ring, and a second set of spokes that extend from the housing cap to the second housing ring.

11. The torque converter stator of claim 3, wherein the actuator includes an annular piston slidably disposed within a cylinder defined by the hub.

12. The torque converter stator of claim 11, wherein the actuator includes a spring configured to bias the piston in one axial direction.

13. The torque converter stator of claim 11, wherein each actuator member of the plurality of actuator members forms a crank coupled to the piston.

14. The torque converter stator of claim 3, wherein each pivot member of the plurality of pivot members is unitarily formed with a corresponding one of the plurality of actuator members to define a shaft that extends through the corresponding blade.

15. The torque converter stator of claim 3, wherein each pivot member of the plurality of pivot members is unitarily formed with a corresponding one of the plurality of actuator members and the corresponding blade.

16. The torque converter stator of claim 1, wherein the plurality of spokes extend at an angle from the hub to the outer ring.

17. A torque converter stator comprising:
   first and second bodies coupled together to form a hub;
   first and second rings coupled together to form an outer ring;
   a plurality of blades disposed radially between the hub and outer ring, all blades of the plurality of blades being pivotable relative to the hub and the outer ring; and
   a plurality of spokes, each spoke of the plurality of spokes having a first end and a second end and extending longitudinally therebetween, each first end being axially offset from the plurality of blades and fixed to the hub, each second end fixed to the outer ring.

18. The torque converter stator of claim 17, wherein the plurality of spokes includes a first set of spokes and a second set of spokes, the first end of each spoke of the first set of spokes being fixedly attached to the first body, the second end of each spoke of the first set of spokes being fixedly attached to the first ring, the first end of each spoke of the second set of spokes being fixedly attached to the second body, and the second end of each spoke of the second set of spokes being fixedly attached to the second ring.

19. The torque converter stator of claim 17, further comprising an actuator disposed within the hub and coupled to the plurality of blades, the actuator being configured to rotate the plurality of blades relative to the hub and outer ring.

20. The torque converter stator of claim 17, wherein the actuator includes a piston and a plurality of crank members, the piston being slidably disposed within the hub, each crank member having a first end non-rotatably coupled to a corresponding one of the plurality of blades and a second end rotatably coupled to the piston, the plurality of crank members being configured to rotate the plurality of blades when the piston moves axially relative to the hub.

* * * * *